US008604628B2

(12) United States Patent
Kondo et al.

(10) Patent No.: US 8,604,628 B2
(45) Date of Patent: Dec. 10, 2013

(54) ROTATION DEVICE

(75) Inventors: Keiko Kondo, Nishitokyo (JP); Megumi Miyagawa, Yatsushiro (JP)

(73) Assignee: Simple Tokyo Co., Ltd., Tokyo (JP)

( * ) Notice: Subject to any disclaimer, the term of this patent is extended or adjusted under 35 U.S.C. 154(b) by 9 days.

(21) Appl. No.: 13/521,157

(22) PCT Filed: Jan. 6, 2011

(86) PCT No.: PCT/JP2011/050121
§ 371 (c)(1),
(2), (4) Date: Jul. 9, 2012

(87) PCT Pub. No.: WO2011/086970
PCT Pub. Date: Jul. 21, 2011

(65) Prior Publication Data
US 2012/0299308 A1    Nov. 29, 2012

(30) Foreign Application Priority Data

Jan. 14, 2010   (JP) .................................. 2010-006208

(51) Int. Cl.
*F02B 63/04*  (2006.01)
(52) U.S. Cl.
USPC ........................................................ 290/1 R
(58) Field of Classification Search
USPC ........................................................ 290/1 R
See application file for complete search history.

(56) References Cited

U.S. PATENT DOCUMENTS

| 8,053,913 | B2 * | 11/2011 | Tseng et al. | 290/1 R |
| 2002/0158471 | A1 * | 10/2002 | Leibowitz | 290/1 R |
| 2003/0155770 | A1 * | 8/2003 | Clinch | 290/1 R |
| 2004/0113430 | A1 * | 6/2004 | Clinch | 290/1 R |
| 2007/0090648 | A1 * | 4/2007 | Barksdale | 290/1 R |

FOREIGN PATENT DOCUMENTS

| JP | 5-256249 | 10/1993 |
| JP | 2000-110706 | 4/2000 |
| JP | 2001-298941 | 10/2001 |
| JP | 2008-45532 | 2/2008 |

OTHER PUBLICATIONS

International Search Report issued Mar. 8, 2011 in International (PCT) Application No. PCT/JP2011/050121.

* cited by examiner

*Primary Examiner* — Tho D Ta
(74) *Attorney, Agent, or Firm* — Wenderoth, Lind & Ponack, LLP

(57) ABSTRACT

There is provided a rotation device comprising a rotatable output axis arranged to have its axis line extending in a horizontal direction perpendicular to the direction of gravity, a plurality of shafts each having one end attached to the output axis, a plurality of first heavy weights each supported on the other end of the shafts, second heavy weights supported slidably by and along the respective shafts at a position nearer the output axis in relation to the first heavy weights, and an eccentric guide member for supporting slidably the second heavy weights to make the rotational orbit of the second heavy weights associated with the rotation of the output axis eccentric to the axial center of the output axis.

12 Claims, 7 Drawing Sheets

ROTATION DEVICE

FIELD OF THE INVENTION

This invention relates to a rotation device capable of sustainably maintaining a rotation.

BACKGROUND OF THE ART

It has been so far thought to accumulate or conserve energy without loss in the form of a rotation and suchlike for use in various types of systems such as a power generating system or other auxiliary rotation devices. A rotation device disclosed in Patent Literature 1 has been known as one example of a technique for sustaining rotation.

Japanese Unexamined Publication No. 08-61214A discloses the rotation device comprising a rotary shaft (output axis), a rotor (shaft) attached to the rotary shaft, an elongated slide weight (heavy weight) freely slidable in the axial direction of the rotor, and a circular guide (guiding member) having a function to make the rotational orbit of the slide weight revolving about the rotary shaft eccentric to the axial center of the rotary shaft. The rotation device disclosed in Japanese Unexamined Publication No. 08-61214A serves to rotate the output axis through the use of the principle of leverage, in which the rotational orbit of the heavy weight associated with the rotation of the output axis restricted by the circular guide member is made eccentric to the axial center of the output axis, so that the downward rotating moment of the heavy weight becomes larger than the upward rotating moment of the heavy weight.

SUMMARY OF THE INVENTION

Problems to be Solved by the Invention

The inventors of the present invention conducted tests by use of the rotation device disclosed in Patent Literature 1 to develop a variety of systems using a device capable of continuing rotation for a long time. However, such a device cannot continue the rotation of the output axis for a long time, thereby making application to various systems difficult.

The inventors of the present invention have examined the reason why the rotation device disclosed in Patent Literature 1 could not continue rotating for a long time. The angular velocity of the rotating heavy weight caused by difference in rotating moment is decreased by friction between the members such as the heavy weight and guiding member. It has been considered that the rotation device of this kind could not continue to rotate for a long time as reduction in angular velocity by friction occurs rapidly in comparison with the magnitude of angular velocity due to difference in rotating moment.

The heavy weight of the rotation device in Patent Literature 1 is so long that the rotating moment close to the output axis is reduced and the difference in rotating moment due to the eccentricity is also reduced. Thus, sufficient angular velocity was thought to be unavailable because the difference of the resultant rotating moment becomes small relative to the heft of the heavy weight.

Consequently, the inventors of this invention have earnestly provided for research to develop a device capable of continuing the rotation of the output axis for a long time even when causing friction between the member elements by increasing the difference of the rotating moment of the heavy weight to increase the angular velocity compared with the friction.

Means for Solving the Problems

In view of the foregoing disadvantages inherent in the known types of rotation devices, it is an object of the present invention to provide a rotation device capable of continuing the rotation of the output axis for a long time so as to be applicable to various type of systems.

According to the present invention, there is provided a rotation device comprising a rotatable output axis arranged to have its axis line extending in a horizontal direction perpendicular to the direction of gravity, a plurality of shafts each having one end attached to the output axis, a plurality of first heavy weights each supported on the other end of the shafts, second heavy weights supported slidably by and along the respective shafts at a position nearer the output axis in relation to the first heavy weights, and an eccentric guide member for supporting slidably the second heavy weights to make the rotational orbit of the second heavy weights associated with the rotation of the output axis eccentric to the axial center of the output axis.

With the second heavy weights supported slidably by the shafts at a position nearer the output axis in relation to the first heavy weights, the second heavy weights revolve in company with the first heavy weights as the rotating moment of the second heavy weights in the downward direction from above is larger than the rotating moment of the second heavy weights in the upward direction from underneath to cause difference in rotating moment due to the second heavy weights. The difference in rotating moment is thus magnified, so that the rotation of the output axis can continue for a long time to the extent to which the rotation device can be applied to various systems even when causing friction between the heavy weight and the guide member.

It is preferable that the plurality of shafts are extendable in the radially outward direction, the plurality of first heavy weights are supported slidably in the axial direction of the shafts, and the first heave weight guide member shaped in a cylinder is provided for making the rotational orbit of the second heavy weights eccentric to the axial center of the output axis with rotation of the output axis while slidably supporting the first heavy weights. The rotating moment of the first heavy weights in the downward direction from above is larger than the rotating moment of the first heavy weights in the upward direction from underneath to cause difference in rotating moment due to the first heavy weights. The differences in rotating moment doubly occur on the first heavy weights and the second heavy weights to magnify the rotating moments. Consequently, the rotation of the output axis can continue for a longer time.

It is desirable that the axial center of the output axis, the center of the guide member and the center of an auxiliary guide member are eccentric thereto on a straight line in the horizontal direction. With this means, the design for assembling each component parts of the rotation device relative to the output axis having the axis line arranged in the horizontal direction can be made easy due to the eccentricity of the axial center of the output axis, the center of the guide member and the center of the auxiliary guide member on a straight line in the horizontal direction.

It is preferable to form the eccentric guide member in a ring, so as to allow the second heavy weight to move along the circumference of the eccentric guide member. The eccentric orbit of the second heavy weight moving along the circumference can be designed according to the design of the shape, radius and center of the ring.

It is preferable to configure the eccentric guide member in the form of a substantially semicircular shape in the lower half of the rotation device so as to allow the outside end surface of the second heavy weight to slidably move along the inner circumferential surface of the eccentric guide member. The term "semicircular shape" here includes a partial circumferential shape of a perfect circle, ellipse, helicoid or the like. The second heavy weight moves slidably along the eccentric guide member in the state pressed against the inner circumferential surface of the eccentric guide member in the lower half of the rotation device by gravitation and centrifugal force.

It is preferable that the eccentric guide member is provided on its inner circumferential surface with a first magnet, and the second heavy weight is provided on its outer end surface with a second magnet. The first magnet and the second magnet are arranged to magnetically repel each other. Thus, the eccentric guide member and the second heavy weight have no contact with each other by the repulsive force of the magnets, consequently to reduce the friction therebetween.

It is preferable to configure the eccentric guide member in the form of a substantially semicircular shape in the upper half of the rotation device so as to allow the inside end surface of the second heavy weight to slidably move along the outer circumferential surface of the eccentric guide member. The second heavy weight moves slidably along the eccentric guide member in the state pressed against the outer circumferential surface of the eccentric guide member in the upper half of the rotation device by gravitation and centrifugal force.

It is preferable that the eccentric guide member is provided on its outer circumferential surface with a first magnet, and the second heavy weight is provided on its inner end surface with a second magnet. The first magnet and the second magnet are arranged to magnetically repel each other. Thus, the eccentric guide member and the second heavy weight have no contact with each other by the repulsive force of the magnets, consequently to reduce the friction therebetween.

It is preferable to form the first heavy weight guide member in a ring, so as to allow the first heavy weight to move along the circumference of the eccentric guide member. The orbit of the first heavy weight moving along the circumference can be designed according to the design of the shape, radius and center of the ring.

Also, it is preferable to have a connection member for synchronizing the sliding motions of the second heavy weights relative to the shaft by securing the paired second heavy weights on opposite sides of the output axis at a regular interval. Synchronizing of the sliding motions of the second heavy weights causes difference in rotating moment when revolving along the eccentric orbit.

It is preferable to have an electric generator coaxially connected to the output axis and an electric transmission terminal for transmitting the electric power generated by the electric generator to outside of the rotation device. When the rotational speed of the output axis is large enough, the electric power can be produced from the rotation of the output axis.

It is preferable to have a starting motor coaxially connected to the output axis. With this starting motor, the output axis can be accelerated when the rotation device is started or the rotational speed of the output axis is slow.

Effect of the Invention

Since the rotation device according to the present invention having the second heavy weights slidably supported by the shaft at a position nearer the output axis in relation to the first heavy weights, the second heavy weights revolve in company with the first heavy weights as the downward rotating moment created by the second heavy weights becomes larger than the upward rotating moment created by the second heavy weights, consequently to cause difference in rotating moment. As the difference in rotating moment is magnified, the rotation of the output axis can continue for a long time to the extent to which the rotation device can be applied to various systems even when causing friction between the heavy weights and the guide member.

MODES FOR CARRYING OUT AN INVENTION

The embodiments of a rotation device according to the present invention will be described hereinafter with reference to the accompanying drawings. FIG. 1 through FIG. 5 schematically illustrated the configuration of a first embodiment of the rotation device of the invention. The rotation device in this embodiment is applied an electric generating system.

Figure 1:
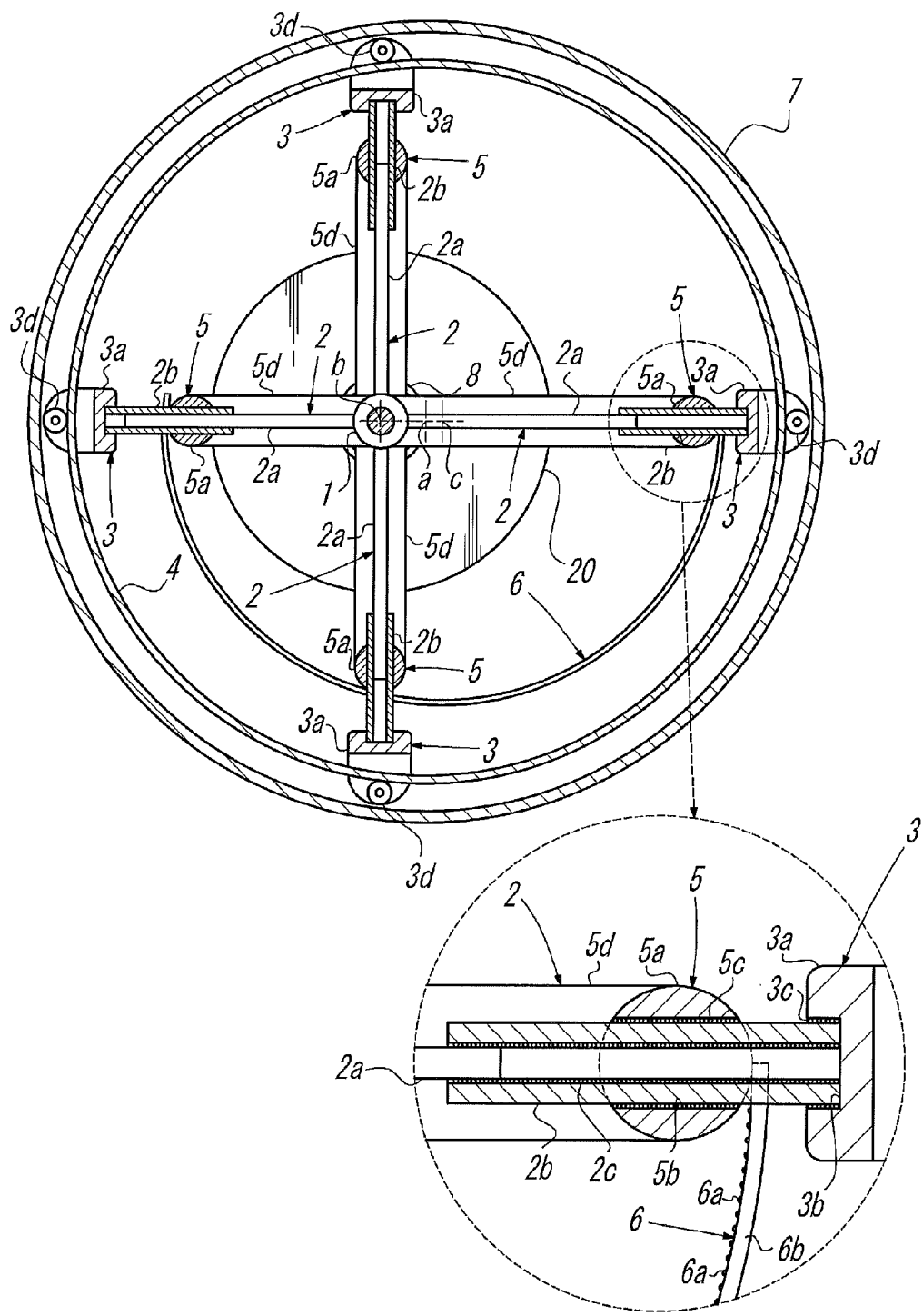
FIG. 1 is an axial sectional view and a partially enlarged view schematically illustrative of the configuration of a first embodiment of a rotation device according to the present invention.
Figure 2:
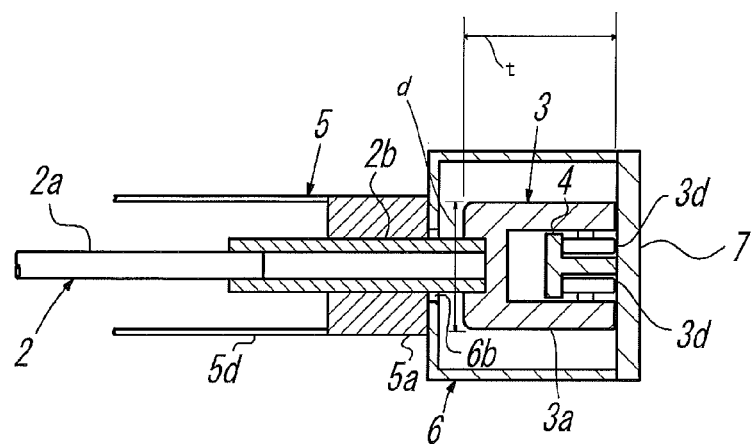
FIG. 2 is a sectioned view enlarging the principal part of the rotation device of FIG. 1.
Figure 3:
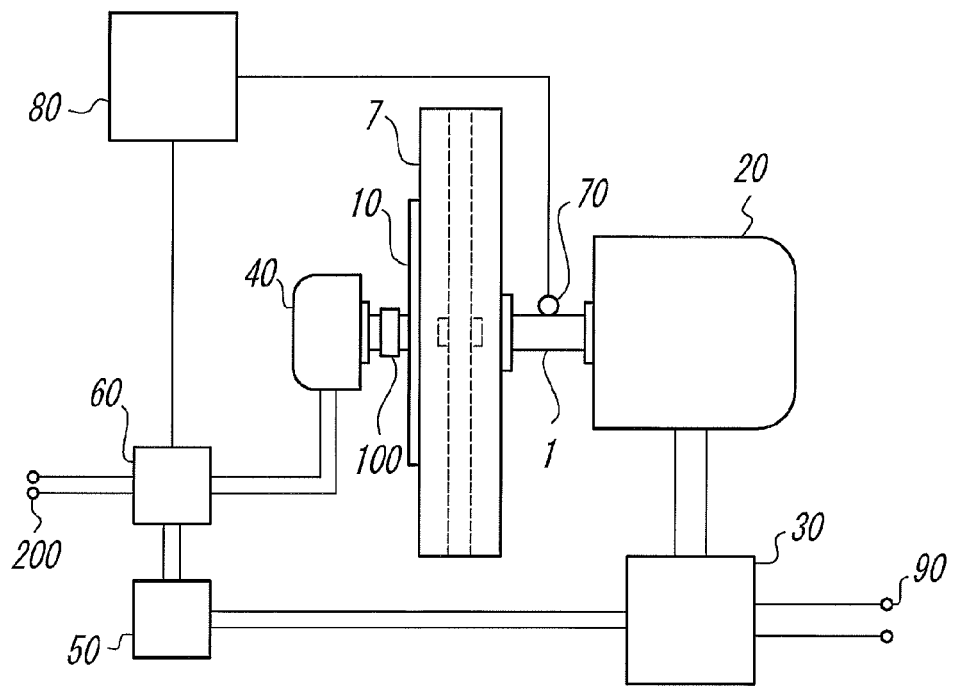
FIG. 3 is a block diagram showing the configuration of an electric generating system incorporated in the rotation device of FIG. 1.

The rotation device in this embodiment comprises, as essential part elements, an output axis 1, a plurality of shafts 2 (four shafts in this case), a plurality of first heavy weights 3 (four weights in this case) attached respectively to the shafts 2, a first heavy weight guide member 4 for the plurality of first heavy weights 3, a plurality of second heavy weights 5 (four weights in this case) respectively attached to the plurality of shafts 2, and an eccentric guide member 6 for the plurality of second heavy weights 5, as illustrated in FIG. 1 to FIG. 3. The rotation device further comprises a flywheel 10 coaxially attached to the output axis 1.

The electric generating system includes an electric generator 20 coaxially connected to the output axis 1, an electric transmission terminal 30 electrically connected to the electric generator 20, a motor 40 for starting the rotation device, a battery 50 electrically connected to the electric transmission terminal 30, an electric drive circuit 60 electrically connected to the battery 50 and the motor 40, a rotational speed sensor 70 for detecting the rotational speed of the output axis 1, and a controller 80 electrically connected to the rotational speed sensor 70 and the electric drive circuit 60.

The output axis 1 is supported by a not-illustrated supporting frame so as to have its axis line extending in a horizontal direction perpendicular to the direction of gravity. The output axis 1 is further supported rotatably by a radial bearing 8 eccentric to the center of a cylindrical outer frame 7 fixedly secured by the supporting frame so as to project its both end portions outwards.

Each of the shafts 2 is composed of a straight piston member 2a shaped in a rod, a tube-shaped cylinder member 2b into which the leading end portion of the piston member 2b is fitted slidably, and a thrust receiving member 2c interposed between the piston member 2a and the cylinder member 2b. The piston member 2a has its one end firmly fixed on the output axis 1 and extends radially outward. In this embodiment, the four rod-shaped piston members 2a are attached to the output axis 1 at right angles with one another. Each cylinder member 2b has its rear end portion slidably engaged with the piston member 2a and its leading end portion securely fitted in a block member 3a as described later of the respective first heavy weights 3. That is, the piston members 2a and cylinder members 2b provide an extensible/retractable function to the respective shafts 2. The thrust receiving member 2c is composed of a bearing, oil or the like to have a function of reducing thrust friction between the piston member 2a and the cylinder member 2b.

Each of the first heavy weights comprises, as essential part elements, the block member 3a having a section shaped in an angular U as illustrated in FIG. 2 (i.e. a section having a plane passing through the axial centers of the output axis 1 and shafts 2), a shaft insertion hole 3b formed in a concave shape in the center of the inside end of the block member 3a (end on the side of the output axis), a shaft receiving member 3c formed on the inner circumferential surface of the shaft insertion hole 3b, and a roller member 3d disposed between angular-U shaped arms at the outside end of the block member 3a (the end on the opposite side of the output axis).

The block member 3a is made of a metallic material with a heavy specific gravity in a solid form without an unnecessary inner space. The block member 3a has a thin thickness (t) along the axial direction of the shaft 2 and weight converging on the leading end of the shaft 2 so as to increase the rotating moment of the first heavy weight 3. In this embodiment, as illustrated in FIG. 2, the block member 3a is so formed that the width (d) is made larger than the thickness of the shaft 2 to relatively reduce the thickness (t) while increasing the weight. The outside end surface of the block member 3a, which is opposite to the outer frame 7, has a curved surface with a circular axial section having curvature radius smaller than the curvature radius of the outer frame 7, as illustrated in FIG. 1, so as not to collide or cause friction with the outer frame 7.

Into the shaft insertion hole 3b, there is inserted the leading end portion of the cylinder member 2b of the shaft 2. The shaft insertion hole 3b and the cylinder member 2b are fixedly formed by the shaft receiving member 3c. That is, the first heavy weight 3 is slidably supported at the leading end portion of the shaft 2 through the cylinder member 2b. The roller members 3d are arranged in pairs coaxially with one another between the angular U-shaped arms of the block members 3a so as to move in the rolling motion direction along the inner circumferential surface of the outer frame 7.

The first heavy weight 4 is a cylindrical rail frame composed of a circumferential section shaped in a letter T (see FIG. 2) and a perfect-circular section perpendicular to the axial line of the output axis 1 (see FIG. 1). The leading end of a T-shaped central projection of the rail frame is fixed on the inner circumferential surface of the outer frame 7, and the outer circumferential surface (surface opposite to the outer frame 7) of cylindrical wing portions on the both sides of the central projection serves as a rolling surface for the roller member 3d of the first heavy weight 3. The first heavy weight guide member 4 and the outer frame 7 are fixedly arranged coaxially. The axial line (axial center) (b) of the output axis 1 is arranged eccentric to the common center (a) of the first heavy weights 4 and the ring or cylinder of the outer frame 7. It is desirable to place the center (a) and the axial center (b) on the line in the horizontal direction perpendicular to the gravity. The axial center (b) of the output axis is geometrically eccentric to the center (a) of the first heavy weight guide member 4 and the outer frame 7 in this embodiment, but the rotation device of the invention is usable even when the amount of eccentricity is rather small, i.e. when the axial center (b) of the output axis 1 is disposed in the proximity of the center (a) of the first heavy weight guide member 4 and the outer frame 7.

The plurality of second heavy weights 5 each comprise a cylindrical column-shaped block member 5a, a shaft insertion hole 5b bored in the direction perpendicular to the axial line of the column-shaped block member 5a, a thrust receiving member 5c interposed between the shaft insertion hole 5b and the cylinder member 2b of the shaft 2, the connection member 5d for mutually connecting the block members 5a of the pair of second heavy weights 5 disposed opposite to each other astride the two shafts 2 and the output axis 1.

The block member 5a is made of a metallic material with a heavy specific gravity in a solid form without an unnecessary inner space. The outside end surface of the block member 5a, which is opposite to the eccentric guide member 6, has a curved surface with a circular axial section having curvature radius smaller than the curvature radius of the eccentric guide member 6, as illustrated in FIG. 1, so as not to collide or cause friction with the eccentric guide member 6. In this embodiment as illustrated in FIG. 1, the block member 5a is made of a substantially spherical metallic material.

The shaft insertion hole 5b penetrates the block member 5a. Into the shaft insertion hole 5b, the cylinder member 2b of the shaft 2 is inserted. The thrust receiving member 5c is composed of a bearing, oil or the like to have a function of reducing thrust friction between the shaft insertion hole 5b and the cylinder member 2b of the shaft 2. The connection member 5d serves to settle the distance between the block members 5a of the pair of second heavy weights 5 disposed opposite to each other astride the output axis 1, thus to fulfill a synchronizing function with the shaft 2. The connection member 5d in this embodiment serves to mutually connect the block members 5a and is formed of a plurality of slender metallic shafts extending in parallel to the shaft 2 astride the shaft 2. The distance between the block members 5a in the two second heavy weights 5 is adjusted to bring the outer end surface of the respective block members 5a into contact with the sliding surface on the inner circumferential side of the rail frame of an eccentric guide member 6 described below.

The eccentric guide member 6 is formed of a square cylinder of which one prismatic surface is defined by the outer frame 7 and is a rail frame having the section along the center axis of the square cylinder, which is perpendicular to the axial line of the output axis 1, is shaped in the form of a half of a substantially perfect circle ring (see FIG. 1). The rail frame has its one end firmly fixed on the inner circumferential surface of the outer frame 7, so as to allow the first heavy weight 3 to move through an inner space defined by the square cylinder (see FIG. 2). The eccentric guide member 6 is configurated to allow the second heavy weight 5 to move along the ring-shaped circumference. To be more specific, the leading end portion (outer side surface) of the second heavy weight 5 moves the inner circumferential surface of the rail frame of the eccentric guide member 6. Although not clearly illustrated in FIG. 2, a clearance is ensured between the outside end surface of the block member 5a of the second heavy weight 5 and the sliding surface of the eccentric guide member 6.

The second heavy weight 5 is supported by the shaft 2 on the inner circumferential side of the first heavy weight 3, namely, at a position nearer the output axis so as to slidably move along the cylinder member 2b of the shaft 2.

The eccentric guide member 6 in this embodiment is basically formed of a square cylinder shaped in the form of a substantially semicircular ring in the lower half of the rotation device and has its left-hand part in FIG. 1 extending slightly upward so as to make introduction into the forwarding direction more easy when the second heavy weight 5 moves upward.

The eccentric guide member 6 further comprises a sliding support 6a such as a bearing for desirably sliding the second heavy weight 5 and an annular slit 6b (FIG. 2) through which the cylinder member 2b of the shaft 2 penetrates.

As illustrated in FIG. 1, the center (c) of the ring of the eccentric guide member 6 is eccentric to both the axial center (b) of the output axis 1 and the center (a) of the first heavy weight 4. It is desirable to place the center (a), axial center (b) and center (c) in the same straight line in the horizontal direction perpendicular to the direction of gravity.

Meanwhile, only the substantially semicircular sliding surface of the lower half of the eccentric guide member 6 is illustrated in FIG. 1 for sake of simplicity in configuration, but it may be further extended upward or formed in a perfect circle.

The diameter of the eccentric guide member 6 is designed to prevent the inner surface of the eccentric guide member 6 from intervening the rotation of the first heavy weight 3. As the diameter of the eccentric guide member 6 and the position of the center (c) define the orbit of the second heavy weight 5 and the positional relation among the second heavy weights 5 connected by the connection member 5d, the magnification degree of the rotating moment produced by the second heavy weights 5 is determined. That is, the rotating moment of the second heavy weights 5, as such, becomes large as the diameter is made lager to reduce the eccentricity, and meanwhile, the difference in rotating moment between the second heavy weights 5 moving upward and downward becomes large as the diameter is made small to increase the eccentricity. By way of example, the diameter of the eccentric guide member 6 may be made 65% to 90% of the diameter of the first heavy weight guide member 4, and the eccentricity may be made 1% to 5% of the diameter of the first heavy weight guide member 4.

The flywheel 10 is coaxially connected to one end of the output axis 1, so that the rotating operation of the output axis 1 can be made stable.

The electric generator 20 is coaxially connected to the opposite end of the output axis 1 to the flywheel 10 to fulfill the power generating function by electromagnetic induction due to the rotation of the output axis 1.

The electric transmission terminal 30 incorporates an electric transformer for transforming the electric power generated by the electric generator 20 and other means, so that the electric power thus generated is transmitted to outside of the rotation device. The electric transmission terminal 30 is electrically connected to at least a power transmission line 90 and the battery 50.

The starting motor 40 is a small-sized motor coaxially connected to one end of the output axis 1 through a one-way clutch 100 to rotate the output axis 1 in the initial or other stages.

The battery 50 is electrically connected to the electric transmission terminal 30 to be charged with the electric power transmitted via the electric transmission terminal 30 as a starting power for the motor 40.

The electric control circuit 60 is electrically connected respectively to the starting motor 40, battery 50 and an AC source 200 and comprises a DC-AC converter, a switching circuit, an electric transformer and so on. The electric control circuit 60 has a function of transmitting the electric power from the battery 50 and the AC source 200 selectively to the starting motor 40.

The rotational speed sensor 70 serves to detect the rotational speed of the output axis 1 by use of an optical or electromagnetic means or the like.

The controller 80 incorporates a digital computer including a microprocessor and is electrically connected to the electric drive circuit 60 and the rotational speed sensor 70. The control 80 performs the controlling processing illustrated in FIG. 5.

First in this controlling processing, the motor 40 is started by the electric power from the AC generator (Step S1). Next, determination as, to whether or not the rotational speed of the output axis 1 exceeds the second threshold value on the basis of a speed signal detected by the rotational speed sensor 70 is performed (Step S2).

When the rotational speed is less than the second threshold value and short of a high speed of rotation (in the case of NO), the determination processing is repeated. When it exceeds the second threshold value to reach high-speed rotation (in the case of YES), electricity supply to the starting motor 40 is suspended according to instructions given to the electric control circuit 60 (Step S3), while the rotation device continues rotational operation to generate electric power by means of the electric generator 20 connected to the output axis 1 and charge the battery with the electric power thus generated (Step S4).

On the other hand, determination as to whether or not the rotational speed of the output axis 1 is less than the first threshold value on the basis of a speed signal detected by the rotational speed sensor 70 is performed (Step S5). When the rotational speed exceeds the first threshold value and is not up to a low speed of rotation (in the case of NO), the processing returns to Step S2 to repeat the processing of Step S2 to Step S5. When the rotational speed is less than the first threshold value to reach the low speed of rotation (in the case of YES), determination as to whether or not the amount of electric power charged into the battery 50 is enough for activating the starting motor 4 (Step S6).

When not enough (in the case of NO), the processing returns to Step S1 to repeat the processing of Step S1 to Step S6. When enough (in the case of YES), the electric power is supplied to the starting motor 40 according to instructions given to the electric control circuit 60 (Step S7). Thus, when the amount of electric power charged into the battery 50 is not enough, the electric control circuit 60 serves to switch the electric supply from the starting motor 40 to the AC source 200.

Next, determination as to whether or not the rotational speed of the output axis 1 exceeds the second threshold value on the basis of a speed signal detected by the rotational speed sensor 70 is performed (Step S8).

When the rotational speed is less than the second threshold value and short of a high speed of rotation (in the case of NO), the determination processing is repeated. When it exceeds the second threshold value to reach high-speed rotation (in the case of YES), electricity supply to the starting motor 40 is suspended according to instructions given to the electric control circuit 60 (Step S9), while the rotation device continues rotational operation to generate electric power by means of the electric generator 20 connected to the output axis 1 and charge the battery with the electric power thus generated (Step S10).

Subsequently, upon performing determination as to whether or not instructions to stop the operation are issued (Step S11), when there is no stopping instructions (in the case of NO), the processing returns to Step S51 to repeat the processing from Step S5 to S11. When the stopping instructions are given (in the case of YES), the operation of the rotation device is stopped by compulsion.

As is described above, according to this embodiment, the output axis 1 rotates by driving the starting motor 4 to rotate by supplying the electric power from the AC source 200. When the rotational speed of the output axis 1 thus driven reaches the high speed of rotation, the supply of the electric power to the starting motor 40 is stopped.

In the state of rotating the output axis 1 at the high speed rotation, the first heavy weight 3 moves along the first heavy weight guide member 4 and outer frame 7. That is, the first heavy weight 3 when located downward is pressed against the outer frame 7 by gravitation and centrifugal force to move in the inner circumferential direction of the outer frame 7 by means of the roller member 3d moving by rolling along the inner circumferential surface. The first heavy weight 3 when located upward is pressed against the first heavy weight guide member 4 by gravitation to move by means of the roller member 3d moving by rolling along the inner circumferential surface of the first heavy weight guide member 4.

As is described above, since the axial center (b) of the output axis 1 is eccentric to the center (a) of the first heavy weight guide member 4 and outer frame 7, the first heavy weight guide member 4 and the outer frame 7 are far distant from the output axis 1 on the right side in FIG. 1 and approximate thereto on the left side. However, the first heavy weight 3 is slidable relative to the leading end of the shaft 2 by means of the cylinder member 2b, thus to slide in accordance with the distance between the first heavy weight guide member 4 and outer frame 7 and the output axis 1. Consequently, the first heavy weight 3 can move along the first heavy weight guide member 4 and the outer frame 7.

Figure 4:
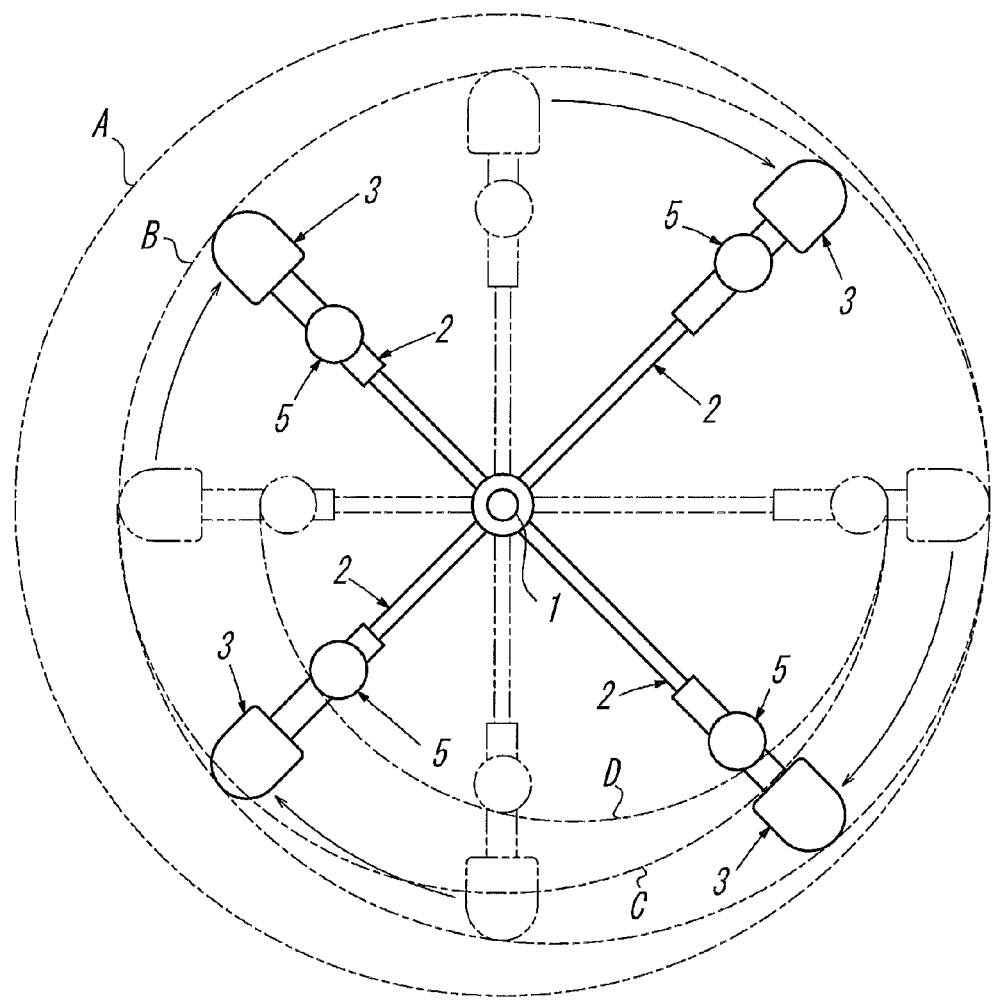
FIG. 4 is a view illustrating the behavior of the rotation device of FIG. 1.
Figure 5:
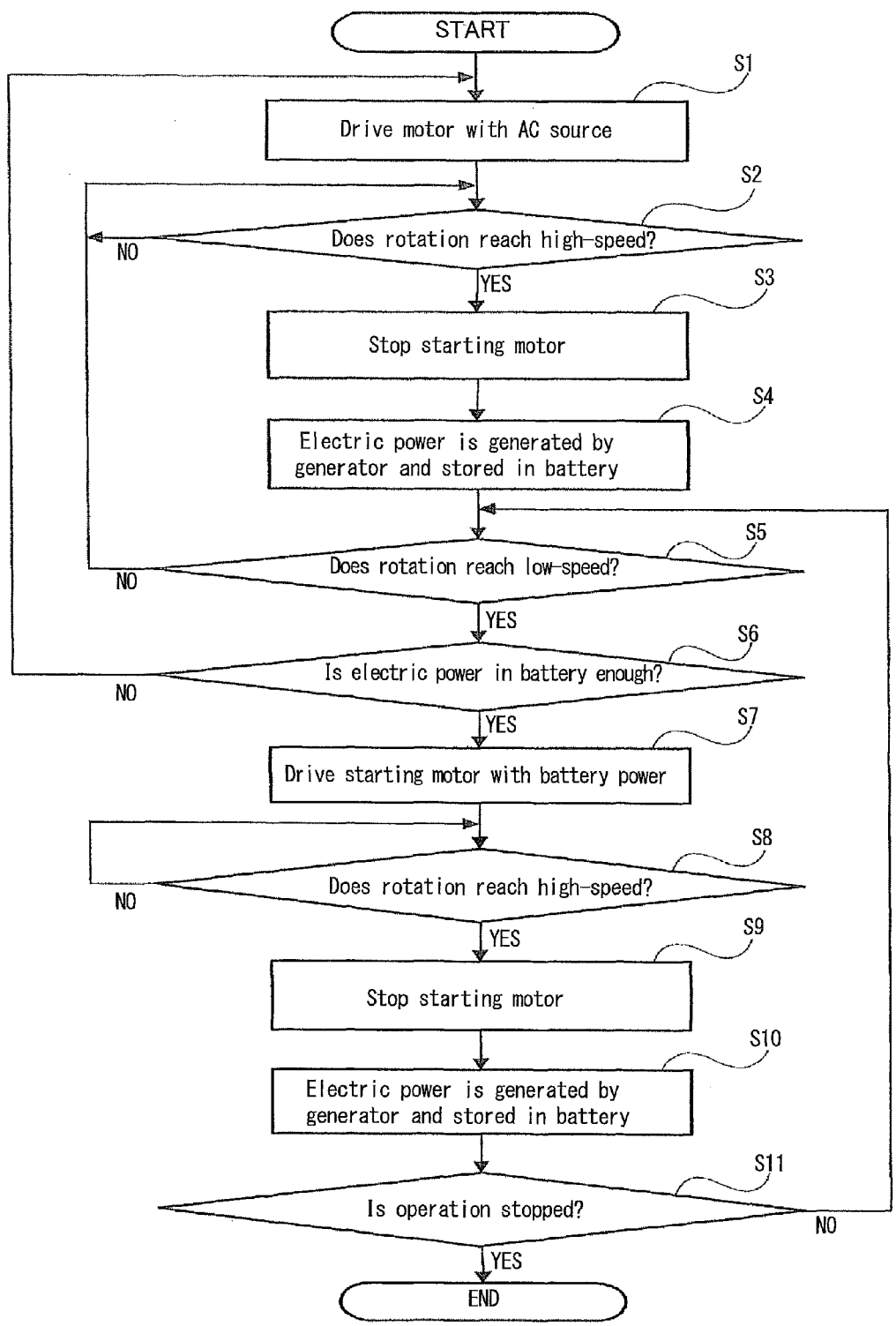
FIG. 5 is a flow chart illustrative of the control processing of a controller in the electric generating system of FIG. 3.

In the case shown in FIG. 4, the path along the first heavy weight guide member 4 and outer frame 7 is the orbit (B). The first heavy weight 3 moves clockwise along the orbit (B) as shown by the arrow in the drawing. At this time, the rotating moment of the first heavy weight 3 when moving upward from the lower part along the orbit (b) is smaller than that when moving along the orbit (A) at equal distances from the output axis 1, and the rotating moment of the first heavy weight 3 moving downward from the upper part along the orbit becomes larger. Thus, the rotation of the upper axis 1 continues rotation for a long time through inertia by use of gravity of the earth.

Specifically, as the roller member 3d is disposed as a rolling structure between the first heavy weight 3 and the first heavy weight guide member 4, friction between the first heavy weight 3 and the first heavy weight guide member 4 can be reduced remarkably. Accordingly, the rotation of the output axis 1 can continue for a very long time.

Further in this embodiment pertain to the second heavy weight 5, the intrinsic orbit (C) accompanied by rotation of the output axis 1 comes to the orbit (D) which is made eccentric by being restrained by the perfect-circle eccentric guide member 6 by virtue of the eccentricity of the aforementioned centers (a) and (c) and the axial center (b). Although the eccentric guide member 6 is disposed at the portion corresponding to the orbit (D) on the lower half in the drawing, the second heavy weight 5 on the upper half is unnecessary because it is connected to the second heavy weight 5 on the opposite lower half by the connection member 5d so as to move in synchronization. Due to the eccentricity, the second heavy weight 5 moving downward from above on the right side of the drawing becomes large in rotating moment, and the second heavy weight 5 moving upward from below becomes small in rotating moment. The axial center (b) of the second heavy weight 5 is eccentric to both the axial center of the output axis and the center of the guide member, consequently to cause large different in rotating moment due to the eccentricity. As a result, the rotation of the output axis 1 can continue for a long time to enable the rotation device to be applied to various types of systems.

Specifically, the first heavy weight 3 sets out to produce a large rotating motion with the downward movement from the horizontal position in an initially positioning direction due to the eccentricity of the center (c) of the eccentric guide member 6, so that the difference in rotating moment of the first heavy weight 3 according to the difference in rotating moment of the second heavy weight 5 can be magnified effectively.

The rotation of the output axis 1 in this embodiment drives the electric generator 20 to generate electric power. The electric power generated by the electric generator 20 is partially stored in the battery 50 and largely serves as electrical energy available from the electric transmission terminal 30. Meanwhile, the starting motor 40 does not make resistance to the rotation of the output axis 1 because transmittance of the rotation of the output axis 1 involved in electric generation to the starting motor 40 is cut by means of the one-way clutch 100.

When the rotational speed of the drive axis 1 in rotation is reduced by friction or other causes to reach a low speed of rotation, electric power supply to the starting motor 20 is restarted. At this time, the electric power is basically fed from the battery 50 to the starting motor 40, but it is supplied thereto from the AC source 200 when the charged amount in the battery 50 is not enough for driving the starting motor 40.

Thereafter, the foregoing operation and control are repeated to carry on rotating the rotary shaft 1 to continually generate electric power.

In a modified embodiment of the invention, the cylinder member 2b may be inserted in a slidable state, or one or more cylinder members of second and subsequent orders may be disposed for being inserted into the cylinder member 2b. In addition, the shaft insertion hole 3b may be elongated to slidably support the cylinder member 2b and the cylinder members of second and subsequent orders. With these structures, the slidable length can be made longer.

In another modified embodiment of the invention, the bearing serving as the sliding support 6a may be changed to magnets. As the magnet, there may be used permanent magnets, electric magnets or the like. All the magnets of the sliding support 6a are provided on their opposite side to the second heavy weight 5 with the same magnetic poles. As an example of the permanent magnets, neodymium magnets can be used suitably. All the magnets on the sliding support 6a are embedded as a plurality of first magnet in the inner circumferential surface of the eccentric guide member 6 so as to make all the negative poles of the magnets introverted. On the opposite side of the second heavy weight 5 relative to the sliding support 6a, there are mounted second magnets. The second magnets have the same magnetic poles facing the first magnets of the sliding support 6a. For instance, the second magnets of the second heavy weight 5 are embedded in the outer end surface of the second heavy weight with their negative poles directed toward the outer end surface. The second magnets may be embedded in any of the second heavy weights 5 or mounted through another part sliding in synchronization with the second heavy weight 5. With this structure, since the first and second magnets mounted respectively on the second heavy weight 5 and the sliding support 6a have the same magnetic pole repelling each other, the second heavy weight 5 is guided by the eccentric guide member 6 without bringing the second heavy weight 5 into contact with the eccentric guide member 6. By this action, friction between the second heavy weight 5 and the eccentric guide member 6 can be reduced. Meanwhile, the magnets may be mounted on the other opposed members, i.e. the opposed portions of the first heavy weight 3 and the first heavy weight guide member 4 so as to have the respective magnetic poles repelling each other.

In the other modified embodiment, the eccentric guide member 6 may be formed in a shape other than the perfect circle to made the center of rotation of the second heavy weight 5 eccentric. For instance, the eccentric guide member 6 may be formed in a partial shape of a spiral so as to make the diameter small toward the clockwise direction (upper left in the drawing).

In the other modified embodiment, some of members for guiding the rotation of the respective members may be formed in other shapes or omitted. For instance, when the eccentric rotation of the second heavy weight 5, which is brought about by the connection member 5d, is assisted sufficiently, the first heavy weight guide member 4 may be formed in a shape other than T-shape such as an I-shape, or the roller member 3d may be omitted. The contact between the members can be lessened by omitting the members to the minimum to decrease the loss of the rotational power, which is caused by friction.

Figure 6:
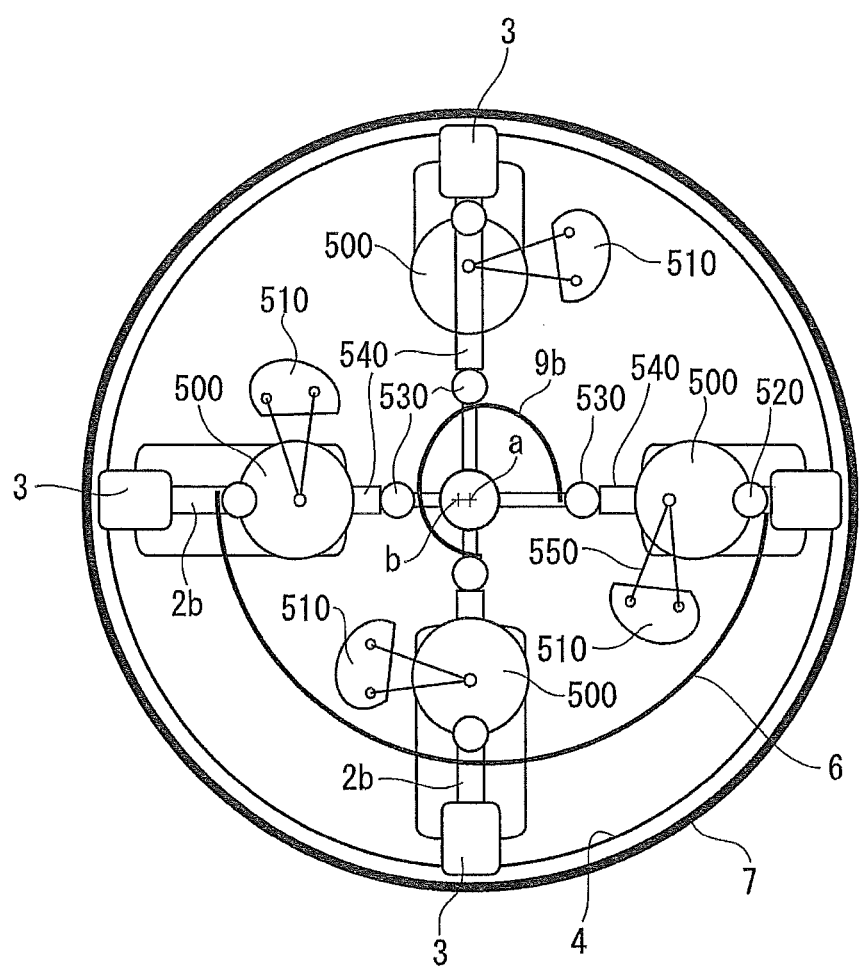
FIG. 6 is an axial sectional view schematically illustrating the configuration of a second embodiment of the rotation device according to the invention.

FIG. 6 illustrates the second embodiment for carrying out the rotation device according to the present invention. This embodiment is provided with the second eccentric guide member 9 having the outer side surface serving as a sliding surface for the rear end portion (inside end portion) of the second heavy weight 5. The connection member 5d of the second heavy weight 5 is omitted.

The second eccentric guide member 9 in this embodiment is formed in a substantially semicircular shape in the upper half of the rotation device and secured so as to be placed on the inside surface of the outer frame 7 and assume a convex shape projecting upward. The radius thereof is made smaller than the eccentric guide member 6 to support the second heavy weight 5 from underneath. The boundary between the eccentric guide members 6 and 9 is provided so as to overlap ⅛ to ¼ of the respective circumferential parts, so that the second heavy weight 5 so that the second heavy weight 5 can move without a break while moving between the eccentric guide members 6 and 9. The inside end surface of the second heavy weight 5 moves slidably along the ring-like outer circumferential surface of the eccentric guide member 9.

This embodiment has the advantage of being able to simplify the structure surrounding the output axis 1 by omitting the connection member 5d. Consequently, this has the same functions and effects as that of the first embodiment.

There may be provided a further modified embodiment comprising first magnets mounted on the outer circumferential surface of the eccentric guide member 9 and second magnets mounted on the inside end surface of the second heavy weight 5, which first and second magnets are arranged to have magnetic poles magnetically repelling each other.

Figure 7:
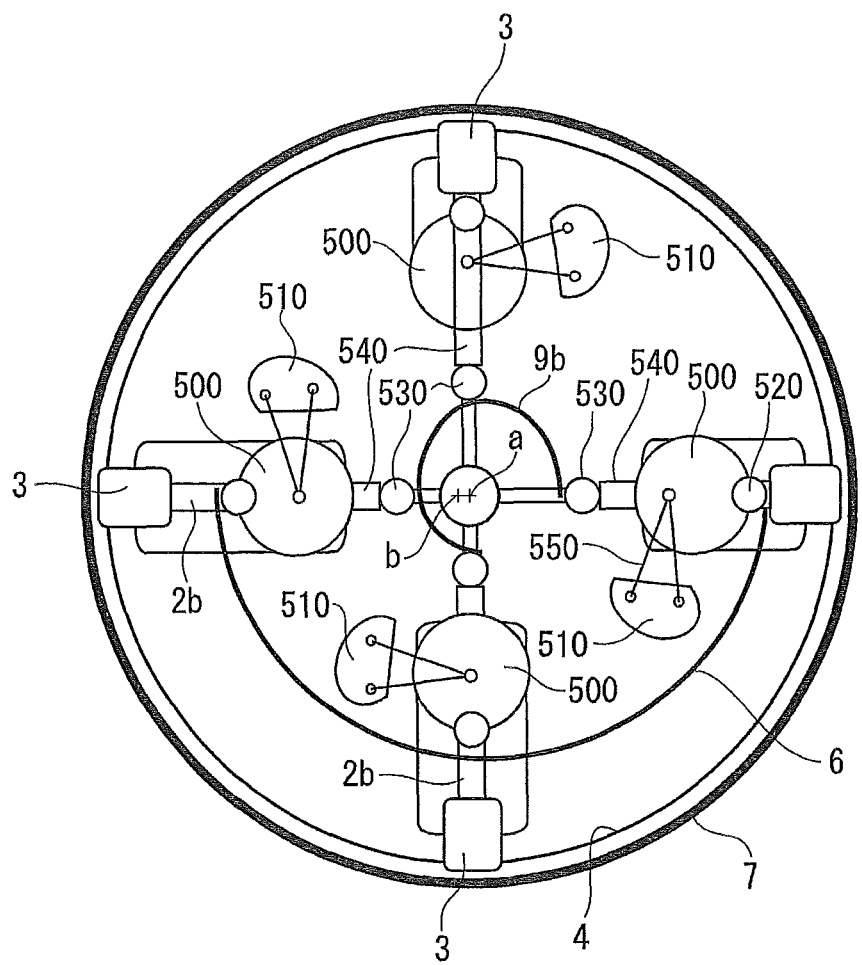
FIG. 7 is an axial sectional view schematically illustrating the configuration of a third embodiment of the rotation device according to the invention.

FIG. 7 illustrates the third embodiment for carrying out the rotation device according to the present invention. This embodiment is provided with second heavy weights 500 each having an assist weight 510 and the second eccentric guide member 9b for making the rotation of the second heavy weight 500 eccentric to the axial center of the output axis 1. In this embodiment, the parts having the same structure and function as in the first and second embodiments are denoted by like numerical symbols and not described for the sake of simplicity in description.

Each second heavy weight 500 as exemplified in the drawings is formed in a cylindrical column shape and has a shaft insertion hole bored in the direction perpendicular to the axial line of the cylindrical column, through which the shaft 2 penetrates. The second heavy weight 500 is provided with a rotatable guide roller 520 contacting the eccentric guide member 6. The second heavy weight 500 can move slidably along the eccentric guide member 6 through the guide roller 520.

Each second heavy weight 500 is provided with an auxiliary guide roller 530 adjacent to the shaft inserting hole in the side facing the output axis 1. The auxiliary guide roller 530 comes in contact with the eccentric guide member 9b. In the illustrated example, the auxiliary guide roller 530 is disposed on the side close to the output axis 1 on the end portion of a support member 540 secured extending toward the output axis 1 on the second heavy weight 500 and provided with a ball bearing for being movable slidably along the eccentric guide member 9b.

The assist weight 510 is a supplementary weight for adjusting the weight and rotating moment of the second heavy weight 500. The assist weight 510 in the illustrated example is connected to the second heavy weight 500 through the supporter 550 and mounted in the direction in which the second heavy weight 500 revolves (the clockwise direction in the drawing). Further, the assist weight 510 may be mounted on the inverse direction opposite to the direction in which the second heavy weight 500 revolves.

The eccentric guide member 9b is disposed to assume a convex shape projecting upward and defines a part of the spiral circumferential shape. That is, it is formed to have the radius larger toward the rotation direction (clockwise direction in the illustrated example). A difference between the smallest radius position and the largest radius position can be designed arbitrarily according to the scale of the device. In the illustrated example, the eccentric guide member 9b has its radius increasing in the clockwise direction from the position just under the output axis 1, so that the radius comes to about twice at the position just under the output axis in the drawing.

The center (a) of the first heavy weight guide member 4 and the ring-like outer frame 7 is eccentric to the axial center (b) of the output axis 1. In this example, the distance between (a) and (b) is 1/1000 to 20/1000 of the radius of the outer frame 7. With this structure, there is substantially no or small eccentricity of the rotary shaft of the first heavy weight 3 in relation to the radius of the outer frame 7. In contrast, the eccentricity of the second heavy weight 500 and assist weight 510 from the rotary shaft, which are guided by the spiral eccentric guide member 9b when revolving, becomes larger in proportion to the perfect circular orbit having the output axis 1 as a center.

This embodiment has the advantage of being small in eccentricity of the rotary shaft of the first heavy weight 3 and low in rotational resistance of the first heavy weight 3 moving along the outer frame. On the other hand, the eccentricity of the rotary shaft of the second heavy weight 500 is so large that the difference in rotating moment brought about by the second heavy weight 500 is effectively magnified due to the eccentricity of the rotary shaft. The functions and effects of this embodiment are the same as those in the first and second embodiment except for those complementarily described above.

In further modified embodiment, the first eccentric guide member 6 may be omitted. The rotation of the second heavy weight 500 is guided by the second eccentric guide member 9b.

Figure 8:
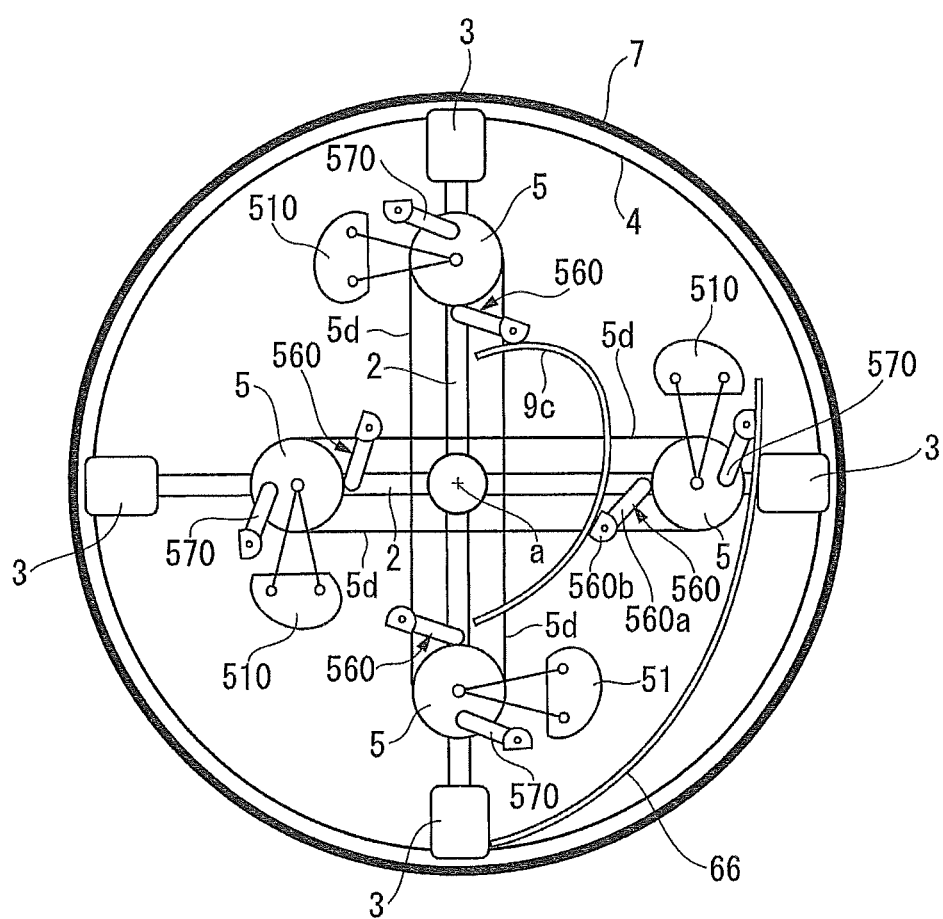
FIG. 8 is an axial sectional view schematically illustrating the configuration of a fourth embodiment of the rotation device according to the invention.

FIG. 8 illustrates the fourth embodiment for carrying out the rotation device according to the present invention. This embodiment has the eccentric guide member 9c for assisting the rotation of the second heavy weight 5. The second heavy weight 5 is provided with a guide roller 560 and an auxiliary guide roller 570. In this embodiment, the parts having the same structure and function as in the first, second and third embodiments are denoted by like numerical symbols and not described for the sake of simplicity in description.

The eccentric guide member 9c is disposed on a part of the circumference surrounding the output axis 1. The shape of the eccentric guide 9c includes one part of a spiral circumferential shape. That is, it is formed to have the radius larger toward the rotation direction (clockwise direction in the illustrated example) of the first heavy weight 3 and the radius smaller with moving from the horizontal direction toward the position just under the output axis 1. In the illustrated example, the guide member 6c extends to the position just under the output axis 1 with increasing in radius from the position just above the output axis 1 toward the clockwise direction and decreasing in radius from the just right side in the drawing.

The guide roller 560 is disposed movable in conjunction with the second heavy weight 5 and set in the direction in which the second heavy weight 5 revolves (clockwise direction in the drawing) to guide the rotation in contact with the guide member 6c. In the illustrated example, the guide roller 560 is provided with a guide roller supporter 560a and a guide roller rotating member 560b and disposed obliquely to the shaft 2 at an angle of 7 to 8 degrees in the clockwise direction relative to the second heavy weight 5.

This embodiment has an eccentric guide member 66 formed only on one part below the output axis 1. The eccentric guide member 66 has the radius increasing toward underneath. In the illustrated example, the eccentric guide member 66 is formed from a little higher portion than the horizontal direction relative to the output axis 1 to the position just under the output axis and has a radius for coming in substantially contact with the first heavy weight guide member 4 at the position just under the output axis.

The auxiliary guide roller 530 is secured on or disposed movable in conjunction with the second heavy weight 5 and placed behind the rotation of the second heavy weight 5 to guide the rotation in contact with the guide member 6c. For instance, the auxiliary guide roller 570 may be provided with a guide roller supporter and a guide roller member and disposed obliquely to the shaft 2 at an angle of about 0 to 15 degrees in the counterclockwise direction relative to the second heavy weight 5.

The axial center (a) of the output axis 1 is substantially coinciding with the center of the first heavy weight guide member 4.

The assist weight 510 is mounted on the opposite side to the direction in which the second heavy weight 5 revolves. The second heavy weights 5 are connected to each other by the connection member 5d similarly to the first embodiment.

The opposed second heavy weights 5 in this embodiment move along the eccentric guide member 9c from the position just above the output axis 1 to the horizontal position as the guide roller 56 is in contact with the eccentric guide member 9c while the auxiliary guide roller 570 is separate from the eccentric guide member 6b. The second heavy weight 5 moves along the eccentric guide member 6b from the horizontal position to the position under the output axis 1 while bringing the auxiliary guide roller 570 into contact with the eccentric guide member 6b. In this wise, the second heavy weight 5 moves the eccentric guide member 9c and the eccentric guide member 6b as the center of rotation rotates eccentric to the axial center (a). This embodiment has a function of effecting stable rotation with low resistance of the first heavy weight 3 moving along the outer frame without making eccentric rotation of the rotary shaft of the first heavy weight 3 while performing the eccentric movement of the second heavy weight 5 only along the eccentric guide member 9c, consequently to effectively cause difference in rotating moment produced by the second heavy weight 5.

As one mode other than those illustrated above, two, three, five or more shafts 2 may possibly be mounted.

As a further mode, plural pairs of shafts 2, first heavy weights 3, first heavy weight guide members 4, second heavy weights 5, and eccentric guide members 6 and 9 may possibly be arranged in combination in the axial direction of the output axis 1.

Further, a first heavy weight or second heavy weight rotating along a noneccentric orbit relative to the output axis 1 and a guide member therefore may possibly be disposed additionally.

While the foregoing embodiments have been described by way of illustration to exemplify the present invention, but shall not be limited thereto or thereby, various modifications and alterations will be apparent to those skilled in the art. As such, it is intended that the present invention only be limited by the terms of the appended claims and their equivalents.

INDUSTRIAL APPLICABILITY

The rotation device according to the present invention is applicable to not only an electric generating system and a power system, but also otherwise various extensive systems.

EXPLANATION OF REFERENCES

1 Output axis
2 Shaft
3 First heavy weight
4 First heavy weight guide member
5; 500 Second heavy weight
5d Connection member
6; 6b; 9; 9b; 9c Eccentric guide member
7 Outer frame
510 Assist weight
520; 560 Guide roller
530; 570 Auxiliary guide roller
540 Support member
550 Supporter
560a Guide roller supporter
560b Guide roller rotating member
a; c Center
b Axial center

What is claimed is:
1. A rotation device comprising a rotatable output axis arranged to have its axis line extending in a horizontal direction perpendicular to the direction of gravity, a plurality of shafts each having one end attached to said output axis, a plurality of first heavy weights each supported on the other end of said shafts, a first heavy weight guide member shaped in a cylinder for slidably supporting said plurality of first heavy weights, second heavy weights supported slidably by and along the respective shafts at a position nearer said output axis in relation to said first heavy weights, and an eccentric guide member for supporting slidably said second heavy weights to make the rotational orbit of said second heavy weights associated with the rotation of said output axis eccentric to the axial center of said output axis, said first heavy weight guide member being formed in a substantially perfect circle ring so as to allow said first heavy weight to move along the circumference of said first heavy weight guide member.

2. A rotation device as set forth in claim 1, wherein said plurality of shafts are extendable in the radially outward direction, said plurality of first heavy weights are supported slidably in the axial direction of said shafts, and said first heave weight guide member shaped in a cylinder is provided for making the rotational orbit of said second heavy weights eccentric to the axial center of said output axis with rotation of said output axis while slidably supporting the first heavy weights.

3. A rotation device as set forth in claim 2, wherein the axial center of said output axis, the center of said guide member and the center of said first heavy weight guide member are eccentric thereto on a straight line in the horizontal direction.

4. A rotation device as set forth in claim 1, wherein said eccentric guide member is formed in a ring so as to allow said second heavy weight to move along the circumference of said eccentric guide member.

5. A rotation device as set forth in claim 4, wherein said eccentric guide member is formed in a substantially semicircular shape in the lower half of said rotation device so as to allow the outside end surface of said second heavy weight to slidably move along the inner circumferential surface of said eccentric guide member.

6. A rotation device as set forth in claim 5, wherein said eccentric guide member is provided on its inner circumferential surface with a first magnet and said second heavy weight is provided on its outer end surface with a second magnet, said first and second magnets being arranged to magnetically repel each other.

7. A rotation device as set forth in claim 4, wherein said eccentric guide member is formed in a substantially semicircular shape in the upper half of said rotation device so as to allow the inside end surface of said second heavy weight to slidably move along the outer circumferential surface of said eccentric guide member.

8. A rotation device as set forth in claim 7, wherein said eccentric guide member is provided on its outer circumferential surface with a first magnet and said second heavy weight is provided on its inner end surface with a second magnet, said first and second magnets being arranged to magnetically repel each other.

9. A rotation device as set forth in claim 1, further comprising a connection member for synchronizing the sliding motions of said second heavy weights relative to said shaft by securing said paired second heavy weights on opposite sides of said output axis at a regular interval.

10. A rotation device as set forth in claim 1, further comprising an electric generator coaxially connected to said output axis and an electric transmission terminal for transmitting the electric power generated by said electric generator to outside of said rotation device.

11. A rotation device as set forth in claim 1, further comprising a starting motor coaxially connected to said output axis.

12. A rotation device as set forth in claim 1, wherein the axial center of said output axis is substantially coincide with the center of said first heavy weight guide member.

* * * * *